(12) United States Patent
Weber et al.

(10) Patent No.: US 11,663,215 B2
(45) Date of Patent: May 30, 2023

(54) SELECTIVELY TARGETING CONTENT SECTION FOR COGNITIVE ANALYTICS AND SEARCH

(71) Applicant: International Business Machines Corporation, Armonk, NY (US)

(72) Inventors: Daniel Weber, Oronoco, MN (US); Nathaniel Evan Rykal, Rochester, MN (US); David Alan Christenson, Fergus Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/991,095

(22) Filed: Aug. 12, 2020

(65) Prior Publication Data
US 2022/0050837 A1    Feb. 17, 2022

(51) Int. Cl.
*G06F 16/00*    (2019.01)
*G06F 16/2455*    (2019.01)
*G06F 40/40*    (2020.01)
*G06F 16/242*    (2019.01)

(52) U.S. Cl.
CPC ........ *G06F 16/2455* (2019.01); *G06F 16/243* (2019.01); *G06F 40/40* (2020.01)

(58) Field of Classification Search
CPC .... G06F 16/22; G06F 16/2455; G06F 16/243; G06F 40/40
See application file for complete search history.

(56) References Cited

U.S. PATENT DOCUMENTS

| | | | |
|---|---|---|---|
| 7,698,329 B2 | 4/2010 | Garg et al. | |
| 7,818,308 B2 | 10/2010 | Carus et al. | |
| 9,058,374 B2 | 6/2015 | Bernnan et al. | |
| 2004/0044659 A1 | 3/2004 | Judd et al. | |
| 2006/0072830 A1* | 4/2006 | Nagarajan ............ | G06V 30/412 375/E7.2 |
| 2013/0268554 A1 | 10/2013 | Kokubu et al. | |
| 2015/0006552 A1* | 1/2015 | Lord .................... | G06F 16/951 707/752 |

FOREIGN PATENT DOCUMENTS

| | | |
|---|---|---|
| JP | 5993849 B2 | 9/2016 |
| WO | 2008130501 A1 | 10/2008 |
| WO | 2012169380 A1 | 12/2012 |
| WO | 2017017678 A1 | 2/2017 |

* cited by examiner

*Primary Examiner* — Thu Nguyet T Le
(74) *Attorney, Agent, or Firm* — Cantor Colburn LLP; Kelsey M. Skodje

(57) ABSTRACT

A computer system includes a natural language processing (NLP) unit, a storage unit, a user interface and a search engine. The NLP unit analyzes a content source to identify one or more sections containing searchable content and generate section metadata respective to each identified section included in the content source. The storage unit stores the section metadata and the user interface receives a section-scoped query aimed at searching an identified section corresponding to the at least one first section metadata stored in the storage unit without searching an identified section corresponding to at least one second section metadata stored in the storage unit. Based on the section-scoped query, the search engine analyzes the at least one first section metadata stored in the storage unit without analyzing the at least one second section metadata.

20 Claims, 10 Drawing Sheets

122

Input Query Terms For Each Section to be Searched

Title: <Insert query terms here> — 500
Patient Information: <Insert query terms here>
Clinical History: <Insert query terms here>
Specimen: <Insert query terms here>
Diagnosis: <Insert query terms here>
Gross Description: <Insert query terms here>
Microscopic Description: <Insert query terms here>
Comment: <Insert query terms here>
Physician Information: <Insert query terms here>
Specimen Information: <Insert query terms here>
Body Site/Procedure: <Insert query terms here>
Pathologist Information: <Insert query terms here>

FIG. 5

SELECTIVELY TARGETING CONTENT SECTION FOR COGNITIVE ANALYTICS AND SEARCH

BACKGROUND

The present invention generally relates to programmable computing systems, and more specifically, to enhanced section detection using a combination of object detection with heuristics.

Information retrieval computing systems can receive search queries from a user and provide answers back to the user. In information retrieval, a question answering (QA) system is tasked with automatically answering a question posed in natural language to the system. A QA system can retrieve an answer by searching a data corpus for documents matching the search query. To assist the QA system, the documents are annotated to describe relationships between co-existing entities. The process of annotating documents is performed by subject matter experts who review the documents and determine whether any entities in the documents can be annotated. The annotations assist the QA system to retrieve the best documents to answer the search query.

SUMMARY

According to a non-limiting embodiment, a computer system includes a natural language processing (NLP) unit, a storage unit, a user interface and a search engine. The NLP unit analyzes a content source to identify one or more sections containing searchable content and generate section metadata respective to each identified section included in the content source. The storage unit stores the section metadata and the user interface receives a section-scoped query aimed at searching an identified section corresponding to the at least one first section metadata stored in the storage unit without searching an identified section corresponding to at least one second section metadata stored in the storage unit. Based on the section-scoped query, the search engine analyzes the at least one first section metadata stored in the storage unit without analyzing the at least one second section metadata.

According to another non-limiting embodiment, a computer-implemented method is provided to selectively target content sections of raw data included in a raw content source. The method comprises analyzing, via a natural language processing (NLP) unit, at least one content source to identify a plurality of sections containing searchable content; and generating, via the NLP unit, section metadata respective to each identified section included in the at least one content source. The method further comprises storing the section metadata in a storage unit; and receiving, via a user interface, a section-scoped query. The section-scoped query is configured to search an identified section corresponding to the at least one first section metadata stored in the storage unit without searching an identified section corresponding to at least one second section metadata stored in the storage unit. Based on the section-scoped query, analyzing via a search engine, the at least one first section metadata stored in the storage unit without analyzing the at least one second section metadata.

A computer program product to control a computer system to selectively target content sections of raw data included in a raw content source, the computer program product comprising a computer readable storage medium having program instructions embodied therewith, the program instructions executable by an electronic computer processor to control the computer system to perform operations comprising analyzing, via a natural language processing (NLP) unit, at least one content source to identify a plurality of sections containing searchable content; and generating, via the NLP unit, section metadata respective to each identified section included in the at least one content source. The operations further comprise storing the section metadata in a storage unit; and receiving, via a user interface, a section-scoped query. The section-scoped query is configured to search an identified section corresponding to the at least one first section metadata stored in the storage unit without searching an identified section corresponding to at least one second section metadata stored in the storage unit. Based on the section-scoped query, analyzing via a search engine, the at least one first section metadata stored in the storage unit without analyzing the at least one second section metadata.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is a block diagram of a display unit included in a user interface of the cognitive analytics and search system shown in FIG. 1 according to a non-limiting embodiment of the present invention;

Figure 1:
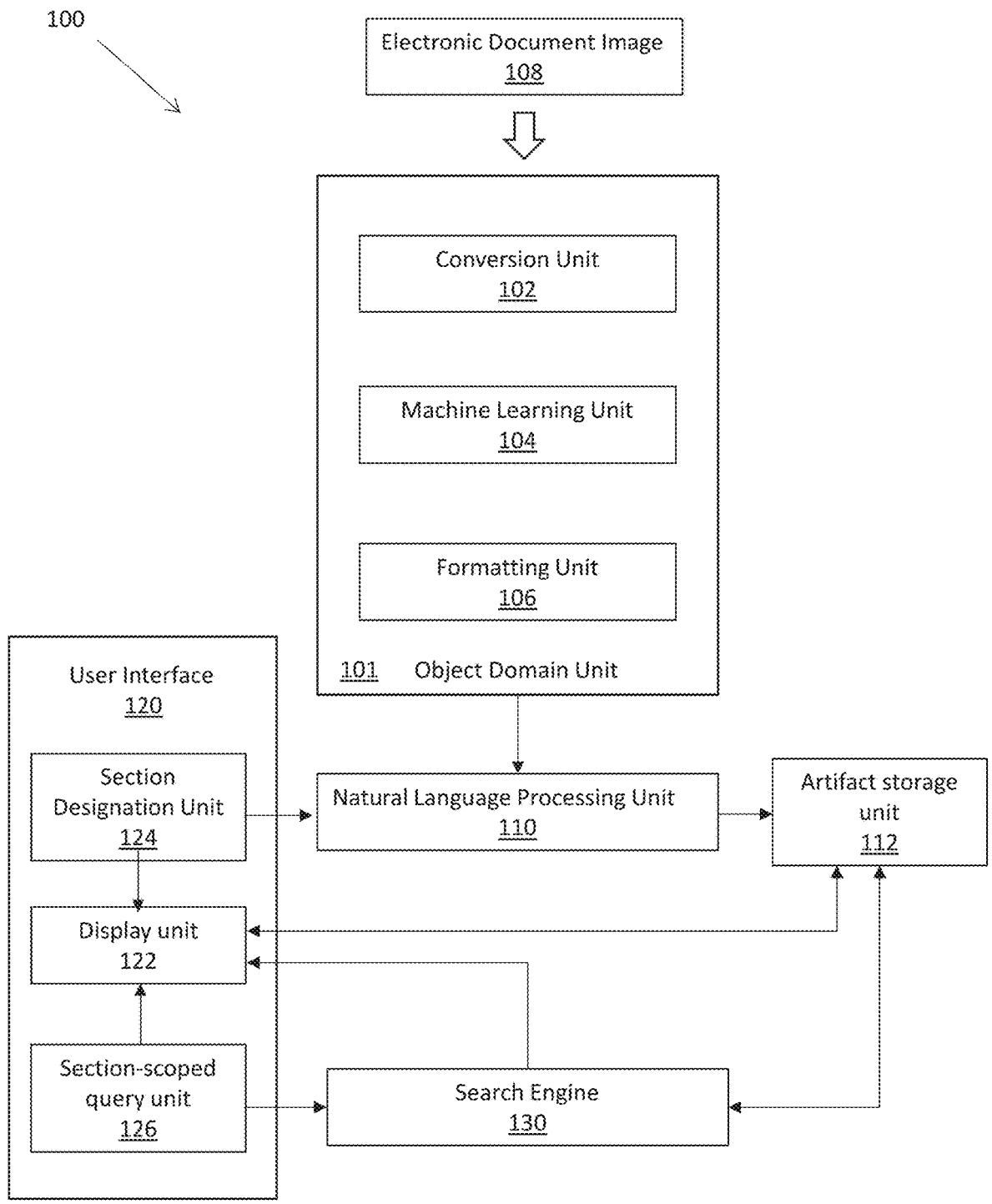
FIG. 1 illustrates a block diagram of a cognitive analytics and search system according to a non-limiting embodiment of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods and computing systems that receive a scanned image of an original text document and convert the image into machine-encodable text that has a same layout as the original text document.

Computer information retrieval systems are operable to receive a search query and, in response, analyze data included in a content source such as an electronic document, for example, to retrieve an answer to the query. Conventional computer information retrieval systems typically operate by performing character recognition (e.g., optical character recognition (OCR)) of the raw data included in the content source. In this manner, the information retrieval system can distinguish topic headings from the body of text associate with a given topic heading, and in turn identify particular sections of included in the content source.

Searching and reviewing literature content can prove to be challenging and cumbersome. Literature in particular may include a collection of non-normalized random documents that pose challenges for reviewers to find relevant content for an area of investigation without reading the entire document. In addition, a user may be required to access multiple search engines (ClinicalTrials.gov, PubMed, Embase), each which is uniquely designed to search a particular genre or technical field. While documents typically have similarly named headings and sections, there are instances where one or more documents have unique named sections or heading, or use a different approach to distinguish individual section within a document. For example, the layout and design of a first document may be completely different from the layout and design of a different second document. Thus, one document very likely contains titles, headings, sub-headings and section layouts that are different from another different document. Therefore, a user that is searching for various topics or information among a multitude of different document types is practically unaware of the different headings and sections contained in all the documents to be analyzed. Furthermore, reviewers are unable to rely on a table of contents or similar navigation aid to determine whether a document potentially contains content relevant to the reviewer's query. For example, research articles may have sections like introduction, discussion, materials and methods, and results while others have proposal, background, rational, techniques, and outcomes. The capability to search all articles for relevancy becomes problematic without using a general text search or full content analytic search which typically returns more content and results than the reviewer can reasonably process efficiently.

One or more embodiments of the present invention addresses one or more of the above-described shortcomings by providing a cognitive analytics and search system configured to selectively target content sections of raw data included in a raw content source. The cognitive analytics and search system allows users (e.g., researches, data reviewers, literature investigators, etc.) to define commonly identified sections that can be separately cognitively analyzed. Accordingly, users can focus their efforts on explicit sections of documents making the discovery of relevant content more efficient. The cognitive analytics and search system also provides normalized enriched document sections within a content source, thereby allowing a single corpus to be of value to multiple user groups.

Turning now to FIG. 1, a cognitive analytics and search system 100 configured to selectively target content sections of raw data included in a content source is generally shown in accordance with one or more embodiments of the present invention. The cognitive analytics and search system 100 includes an object domain unit 101, a natural language processing (NLP) unit 110, an artifact storage unit 112, a user interface 120, and a search engine 130. In one or more non-limiting embodiments, one or more of the object domain unit 101, the NLP unit 110, the artifact storage unit 112, the user interface 120, and the search engine 130 are constructed as an individual electronic hardware controller that includes memory and a processor configured to execute algorithms and computer-readable program instructions stored in the memory.

The object domain unit 101 includes a conversion unit 102, a machine learning unit 104, and a formatting unit 106. In one or more non-limiting embodiments, one or more of the conversion unit 102, the machine learning unit 104, and the formatting unit 106 are constructed as an individual electronic hardware controller that includes memory and a processor configured to execute algorithms and computer-readable program instructions stored in the memory.

The conversion unit 102 is configured to receive a content source including data such as, for example, text and objects, and convert any text found in the content source into a machine-encodable data. The machine learning unit 104 is trained to detect the objects in the content source. The objects include sections (e.g., blocks of text, paragraphs, bullet points) found in the content source. The formatting unit 106 is configured to embed the machine-encodable text file with metadata that describes the layout of the detected objects.

In one or more non-limiting embodiments, the conversion unit 102 is operable to receive one or more electronic document images 108 as the content source and convert the text found in a document image 108 to machine-encodable information, such as, for example, plain text, a URL, a product code, etc. The document image 108 can be generated from an original document. The original document can include, but is not limited to, a paper document, a document generated by word processing software, a healthcare journal article, a patient's medical file, doctor's notes, or other types of literature. Because the content source can include various types of documents, the layout and design (e.g., titles, headings, sub-headings and section layouts) are completely different among the documents input to the conversion unit 102.

In terms of paper documents, a document image 108 can be a scanned image of a paper document, a portable document format (PDF) file, an image captured by an image capturing device, or other form of document image. The image file can be converted to any appropriate image format. In some embodiments, the image format is selected based on a type of machine learning unit used to analyze the image file Accordingly, the conversion unit 102 can use optical character recognition (OCR), for example, to convert the text found in a document image 108 to the machine-encodable information.

The conversion unit 102 can also receive the document image 108 or a bitmap describing the image and identify dark and light areas. The conversion unit 102 can further analyze the dark areas for the presence of alphanumeric characters (text). The conversion unit 102 can apply various methods to determine if the dark area contains any text. For example, the conversion unit 102 can use pattern recognition, in which the conversion unit 102 can compare and recognize the shapes formed by the dark areas with example alphanumeric characters in different fonts and font sizes. The conversion unit 102 can also apply feature detection, in which the conversion unit 102 can be trained to recognize different features such as a number of curves or arrangement or curved and straight lines. For example, the letter "P" can be a combination of a straight line and an arc at one end of the straight line. Once an alphanumeric character is recognized, it can be converted to an encoding standard such as the American Standard Code for Information (ASCII) or other appropriate encoding standard based upon language and geographic location. A computing system can read the ASCII code for the alphanumeric character and generate the corresponding letter or number. Once the conversion unit 102 has identified each alphanumeric character in the image, it can convert the text from the image into machine-encodable text, such as a plain text or a rich text format.

The machine learning unit 104 can further extract features and analyze the features to determine the boundaries of different sections in the document image 108. In some embodiments of the present invention, the machine learning unit can include a convolutional neural network-based classifier. For example, the machine learning unit 104 can use a Regional Convolutional Neural Network (R-CNN). The R-CNN can receive document image 108 and detect objects contained therein. The objects include different sections of the document, including but not limited to paragraphs of text, figures, bullet points, titles, conclusions, and other natural sections of a document. In some embodiments of the present invention, the R-CNN first generates bounding boxes in document image 108 to find candidate sections and runs a classifier on each bounding box. The R-CNN further determines a location and dimension of each bounding box. The R-CNN analyzes the extracted features to determine whether a bounding box encapsulates one or more sections. The R-CNN can be trained to detect features that suggest distinct text blocks. The features can include offsets between text blocks, underlined or bolded words at the beginning of a text block, spacing, punctuation, capitalized strings of text, graphical indicator (e.g., box surrounding text), formatting (e.g., bolding, underlining), or other appropriate features. Upon classification of different objects, the R-CNN removes duplicate classifications and scores the boxes based on the other detected objects in the image. The highest scoring bounding boxes are classified as sections. The objects can take the form of geometric shapes that distinguish the different sections of the original document.

It should be appreciated that a classification type of object is not necessary for object detection. In some embodiments of the present invention, the machine learning unit 104 does recognize the alphanumeric characters at the beginning and end of the section encapsulated by a box. In other embodiments, each alphanumeric character in an image can be indexed, and the machine learning unit 104 recognizes and index number of the beginning and ending character of each text block. However, the machine learning unit 104 does not need to recognize the substance of each text block. In other words, the machine learning unit 104 does not need to describe the purpose or subject matter of an object. The purpose of subject matter can include but not be limited to a title block, patient medical history, diagnosis, or conclusion. Rather, the machine learning unit 104 detects the beginning and ending of distinct sections without deriving meaning from the sections.

The phrases "neural network" and "machine learning" broadly describes a function of electronic systems that learn from data. A machine learning system, engine, unit, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using a machine learning unit 104, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The machine learning unit 104 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the machine learning unit 104 that carry electronic messages between simulated neurons are provided with numeric weights that correspond to the strength or weakness of a given connection. During training, the weights can be adjusted and tuned based on experience, making the machine learning unit 104 adaptive to inputs and capable of learning. After being weighted and transformed by a function determined by the network's designer, the activation of these input neurons is then passed to other downstream neurons, which are often referred to as "hidden" neurons. This process is repeated until an output neuron is activated. The activated output neuron determines which character was read.

The formatting unit 106 is operable to map the objects detected by the machine learning unit 104 back on to the machine-encodable text generated by the conversion unit 102. The formatting unit 106 receives data describing each object from the machine learning unit 104 and encodes the machine-encodable text with metadata describing each object. The metadata respectively describes the boundaries and location of each section. The boundaries and location can be in relation to each other sections, a perimeter of the original document, or both. The formatting unit 106 reformats the machine-encodable text such that the layout of the sections conforms to the layout of the sections in the document image 108. The formatting unit 106 detects the beginning alphanumeric character and the ending alphanumeric character of a text block in a section. The formatting unit 106 arranges the location of the sections. This results in the machine-encodable text having the same layout as arranged in the document image 108.

The user interface 120 includes a display unit 122, a section designation unit 124, and a section-scoped query unit 126. In one or more non-limiting embodiments, one or both of the section designation unit 124 and the section-scoped query unit 126 are constructed as individual electronic hardware controllers that include memory and a processor configured to execute algorithms and computer-readable program instructions stored in the memory.

The section designation unit 124 allows a user to designate one or more readable sections included in the content source 108 (e.g., one or more document images 108) received by the object domain unit 101. In one or more non-limiting embodiments, the section designation unit 124 prompts the user, via the display unit 122, to designate one or more desired sections to be searched within the content source 108. The input designated sections are then delivered to the NLP unit 110 where they are analyzed to generate artifacts corresponding to a given section. The section designation unit 124 receives a controls (e.g., based on an input from a user) indicative different identified sections (i.e., as identified from the user) from multiple document images that when analyzed by the NLP unit 110 all generated artifacts are stored within a common given section name for all document images.

More specifically, the NLP unit 110 receives the reformatted machine-encodable text generated by the object domain unit 101. The NLP unit 110 is configured to apply natural language processing techniques to semantically analyze the text, including determining entities to describe the text, and relationships between textual phrases. In one or more non-limiting embodiments, the NLP unit 110 analyzes the readable sections designated by the user and extracts data content therefrom to generate one or more artifacts. The artifacts include, but are not limited to, fields, concepts, attributes, entities, relations, etc.). The generated artifacts for a given section are then stored in an artifact storage unit 112. In one or more non-limiting embodiments, the NLP unit 110 also generates metadata that indexes one or more given artifacts to a corresponding section. In this manner, the artifacts stored in the artifact storage unit 112 can be searched by the search engine 130 on a per-section basis.

The user interface 120 is granted access to the artifact storage unit 112. In one or more embodiments, the searchable sections corresponding to the artifacts stored in the artifact storage unit 112 are displayed on a display unit 122. Accordingly, the user may view the sections that can be searched on a per-section basis. In one or more embodiments, the section-scoped query unit 126 included in the user interface 120 prompts the user, via the display unit 122, to define a section-scoped query to be performed on one or more of the sections corresponding to the artifacts stored in the artifact storage unit 112. The section-scoped query is aimed at searching an identified section corresponding to the at least one first section metadata stored in the storage unit without searching an identified section corresponding to at least one second section metadata stored in the storage unit. In this manner, a user-defined section-scope query can be designated and performed by the search engine 130 as described in greater detail below.

The search engine receives the user-defined section-scope query, and in response searches the artifact storage unit 112. In one or more embodiments, the search includes analyzing the artifacts corresponding to a respective section indicated by the user's section-scoped query. Accordingly, the search engine 130 returns the artifacts and content (e.g. textual data) from the sections that match the user's section-scoped query. That is, based on the section-scoped query, the search engine 130 analyzes targeted section metadata (i.e., identified by the user) stored in the storage unit without analyzing non-targeted section metadata. In this manner, a user-defined section-scoped query can be performed, which allows users to focus their efforts on explicit targeted sections of documents making the discovery of relevant content more efficient.

Figure 2:
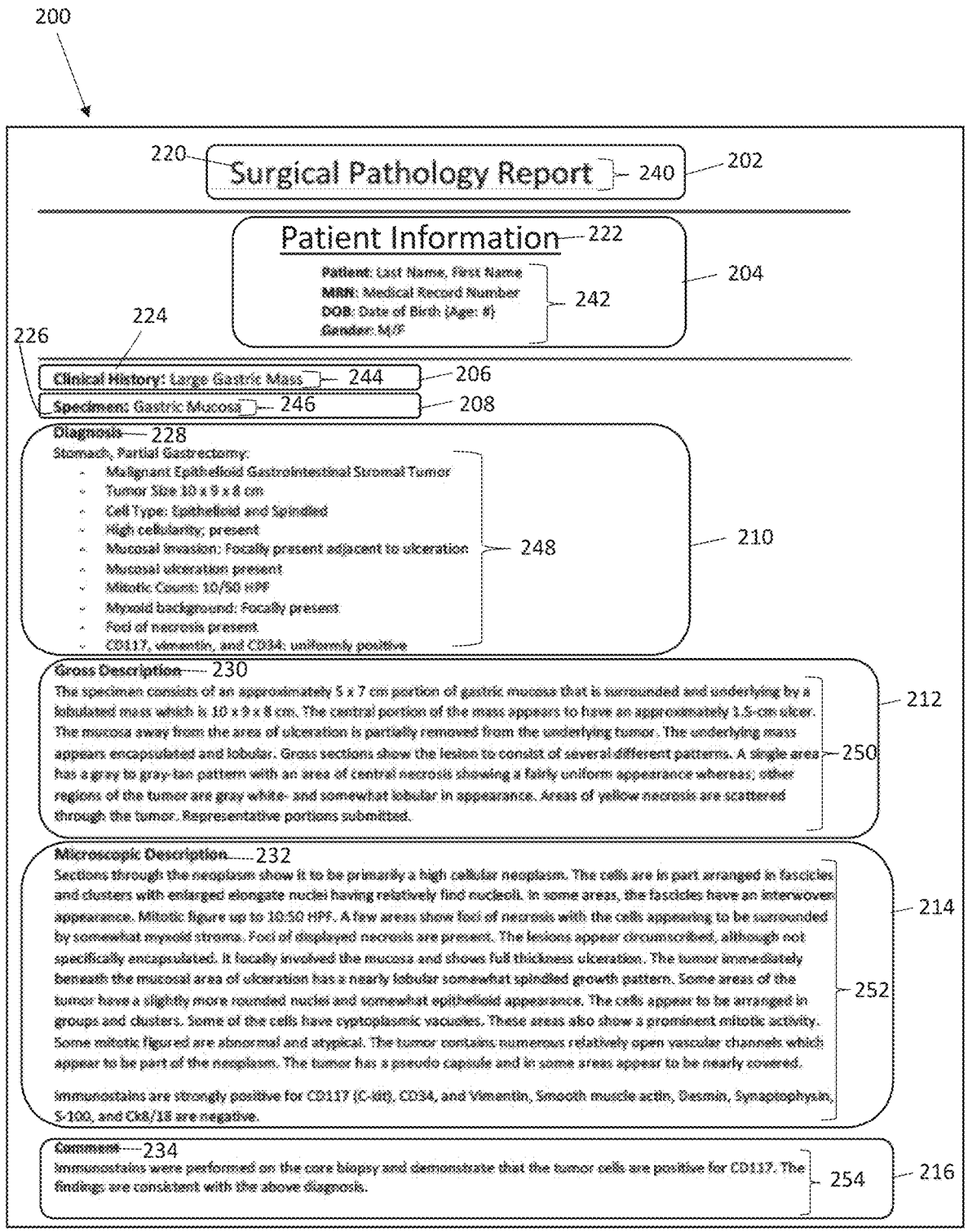
FIG. 2 illustrates a first document image and identified searchable sections according to a non-limiting embodiment of the present invention.

Referring to FIG. 2, a first document image 200 having sections 202, 204, 206, 208, 210, 212, 214, and 216 (collectively referenced as sections 202-216) identified by the section designation unit 124 or the NLP unit 110 is illustrated according to a non-limiting embodiment. Each section 202, 204, 206, 208, 210, 212, 214, and 216 can include readable content including, for example, a heading 220, 222, 224, 226, 228, 230, 232, 234 (collectively referred to as headings 220-234), and searchable content or text 240, 242, 244, 246, 248, 250, 252, 254 (collectively referred to as text 240-254). The headings for the first document 200 this example may be identified, for example, as "Title" 220, "Patient Information" 222, "Clinical History" 224, "Specimen" 226, "Diagnosis" 228, "Gross Description" 230, "Microscopic Description" 232, and "Comment" 234. In this example, the text corresponding to each respective heading 220-234 includes "Surgical Pathology Report" 240, "Patient Information" 222, "Large Gastric Mass" 244, "Gastric Mucus" 246, "Stomach, Partial Gastrectomy" information 248, "Gross Description" textual information 250, "Microscopic Description" textual information 252, and "Comment" textual information 254. Along with identifying the readable sections 202-216, the NLP unit 110 can assign metadata that identifies each section 202-216, each heading 220-234, and the text 240-254. The readable sections 202-216, headings 220-234, and text 240-254, or the metadata indicating the same, can be stored in the artifact storage unit 112. Accordingly, the user interface 120 is granted access to the artifact storage unit 112 and can display the searchable sections 202-216 to the user. In this manner, the user may view the sections 202-216 identified by the NLP unit 110 and designate one or more readable sections so as to perform section-scoped query on a per-section basis.

Figure 3:
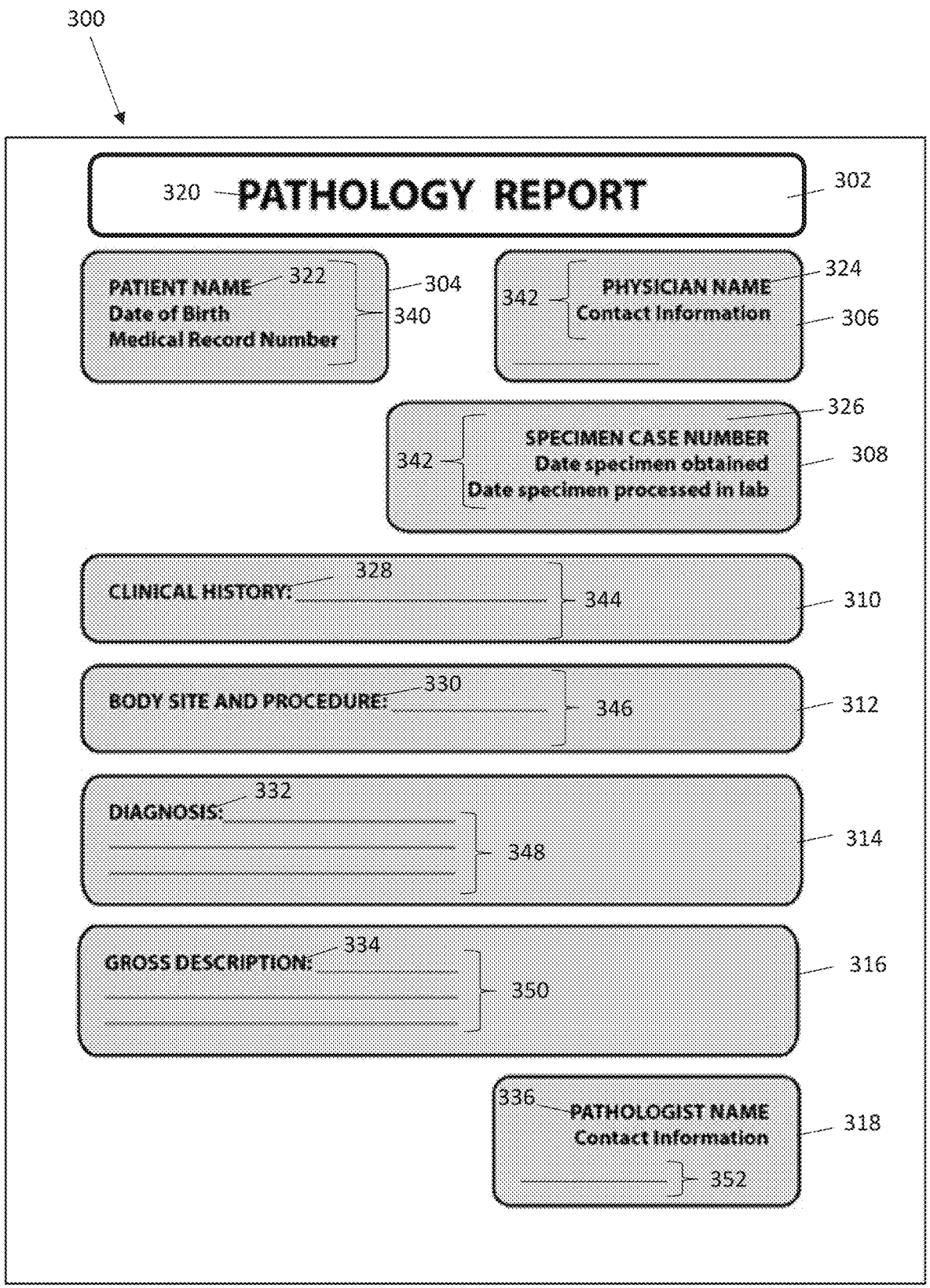
FIG. 3 illustrates a second document image and identified searchable sections according to a non-limiting embodiment of the present invention.

Turning now to FIG. 3, a second document image 300 having sections 302, 304, 306, 308, 310, 312, 314, 316, and 318 (collectively referenced as sections 302-318) identified by the NLP unit 110 is illustrated according to a non-limiting embodiment. The headings for the second document 300 this example may be identified, for example, as "Title" 320, "Patient Information" 322, "Physician Information" 324, "Specimen Information" 326, "Clinical History" 328, "Body Site/Procedure" 330, "Diagnosis" 332, "Gross Description" 334, and "Pathologist Information" 336. Each of the headings 302-318 can have searchable content or text 340, 342, 344, 346, 348, 350, and 352 corresponding to each respective heading 302-318.

As shown in FIG. 3, the second document image 300 has a different set of sections 302-318 compared to the sections 202-216 of the first document image 200 (see FIG. 2). For example, the first document 200 includes a "Microscopic Description" section 214 that is excluded from the second document 300, while the second document 300 includes a "Specimen Information" section 308 that is excluded from the first document 200. As described herein, however, the NLP unit 110 identifies the sections 202-216 of the first document image 200 and the sections 302-318 of the second document image 300 and stores artifacts, i.e., metadata, identifying sections 202-216 of the first document image 200 and the sections 302-318 of the second document image 300. The identified sections 202-216 and 302-318 can then be displayed to a user via the display unit 122.

Figure 4:
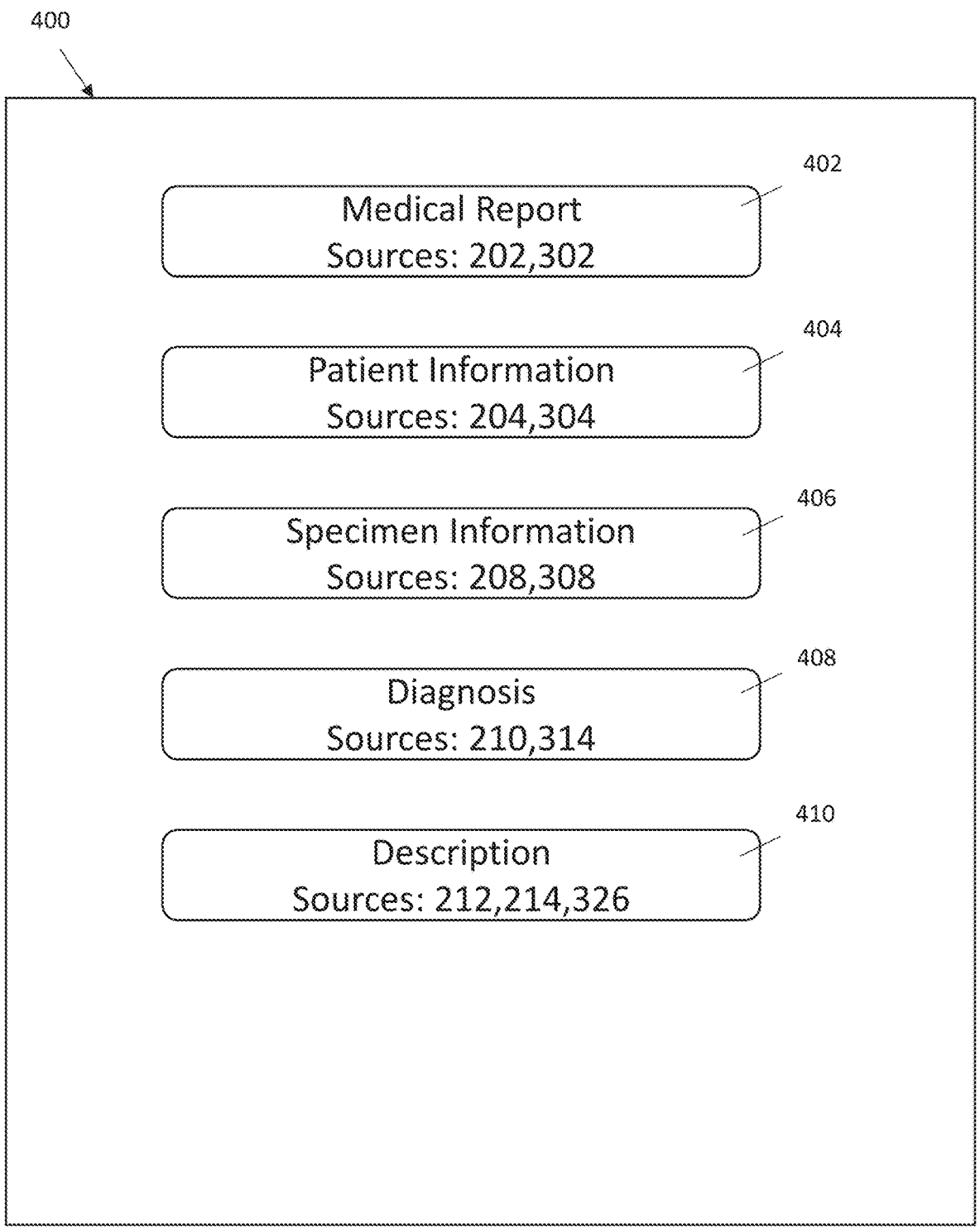
FIG. 4 illustrates a document model image and identified searchable sections generated based on differing source documents according to a non-limiting embodiment of the present invention.

Alternatively, the section designation unit 124 can allow the user to identify identical or differing sections from multiple document sources and specify a common section name and combining multiple sections from document sources as a single section such that when the NLP unit 110 analyzes the content artifacts are persisted in storage unit 112 and can be displayed to a user via the display unit 122. As shown in FIG. 4, The section designation unit 124 allows a user to define a common model that spans sections from document 200 and 300. The user-defined section headers that pull specific source sections as input to the NLP unit 110 with artifacts being stored in storage unit 112 corresponding to the user specified section names.

Referring to FIG. 5, a display unit 122 is illustrated according to a non-limiting embodiment. The display unit 122 groups together the all sections 202-216 and 302-318 from the first and second document images 200, 300 or user defined sections and displays them to the user. In this example, although the first and second document images 200 and 300 do not share the "Microscopic Description" section 214 and the "Specimen Information" section 308, both section headings are displayed together in by the display unit 122. The display unit 122 also prompts the user to input one or more query terms into a given section field 500 for which the user desires to search. In this manner, the user is aware of all the searchable sections associated with all documents 108 input to the system 100 and can perform section-scoped query on a per-section basis.

In some instances, the machine learning unit 104 can determine that information is confidential and should not be transmitted. The machine learning unit 104 can be trained to determine certain documents can contain confidential information such as a patient's identity, security number, contact information, or other confidential information. For example, the machine learning unit 104 can be trained to detect a document potentially contains confidential information based on keywords, a document source, embedded metadata indicating the confidentiality of certain information, or other document feature. In these instances, the formatting unit 106 can replace the confidential information with a generic character such as a "#", mask the confidential information, or otherwise obfuscate the confidential information. In these instances, the formatting unit 106 can continue to reformat machine-encodable text as if the confidential information were present. Therefore, the layout of the machine encodable text appears the same as in the document image 200, but without the confidential information being readable.

Figure 6:
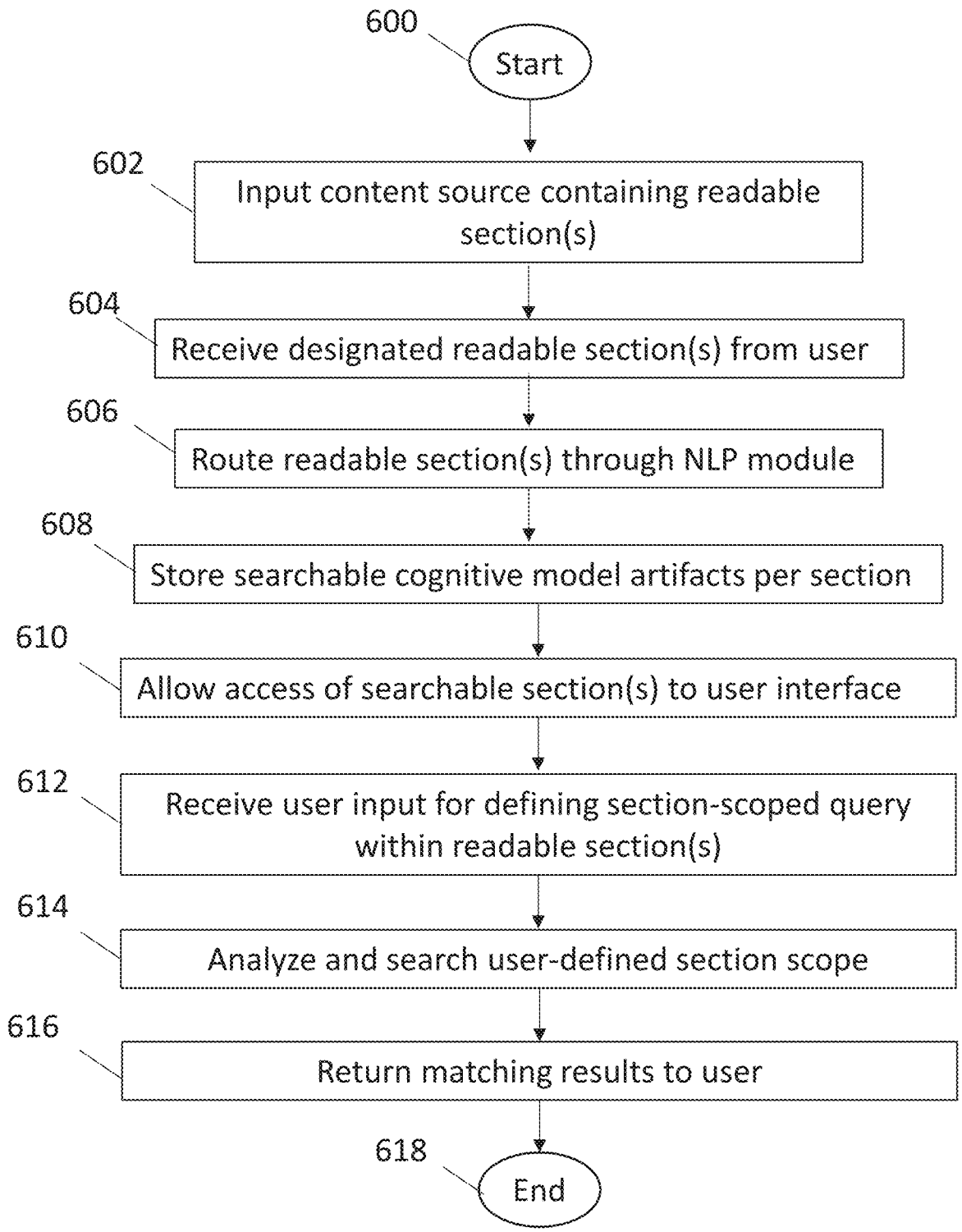
FIG. 6 is a flow diagram illustrating a method of selectively targeting content sections of data included in a content source according to a non-limiting embodiment of the present invention.

Referring to FIG. 6, a flow diagram illustrates a method to selectively target content sections of raw data included in a raw content source As described herein, the raw content source can include an electronic document (e.g., a document image) and the raw data can include text included in the electronic document.

The method begins at operation 600, and at operation 602 content source including one or more detectable objects is input to the object domain unit 101. The content source can include, for example, and electronic document (e.g., document image) converted from an original document containing one or more objects such as, for example, sections of readable text. At operation 604, a user designates, via a user interface 120, one or more readable sections, which are received by the object domain unit 101. As described herein, the user interface 120 includes a section designation unit 124, which prompts a user to designate one or more desired sections to be searched within the content source. The input designated sections are then delivered to an NLP unit 110 to be analyzed as described in greater detail below. The analyzed sections become the searchable sections within a searched artifact storage unit 112 as described in greater detail below.

At operation 606, each designated readable section is delivered to the NLP unit 110. The NLP unit 110 analyzes the readable sections and generates one or more artifacts. The artifacts include, but are not limited to, concepts, attributes, entities, relations, etc.). The generated artifacts for a given section are then stored in the artifact storage unit 112. As mentioned herein, at operation 606 the NLP unit 110 can also generate metadata that indexes one or more given artifacts to a corresponding section. The artifacts and metadata (e.g., section headings) are stored at operation 608. In this manner, the artifacts stored in the artifact storage unit 112 can be searched on a per-section basis.

Turning to operation 610, the user interface 120 is allowed access to the artifact storage unit 112. In one or more embodiments, the searchable sections corresponding to the artifacts stored in the artifact storage unit 112 are displayed on a display unit 122 included with the user interface 120. At operation 612, the user submits, via the user interface 120, a section-scoped query which is received by the search engine 130. As described herein, the section-scoped query unit 126 prompts the user to define the section-scoped query to be performed on one or more of the sections corresponding to the artifacts stored in the artifact storage unit 112. For example, the user can operate the user-interface 120 to input one or more query terms and to select one or more displayed sections to be searched within the artifact storage unit 112. Sections that are not selected by the user are thus not searched within the storage unit 112.

Turning to operation 614, the search engine 130 searches the artifact storage unit 112 and analyzes the artifacts corresponding to a respective section indicated by the user's section-scoped query. Accordingly, the search engine 130 returns results including, for example, artifacts and content (e.g. textual data), from the sections that match the user's section-scoped query input at operation 616, and the method ends at operation 618.

Figure 7:
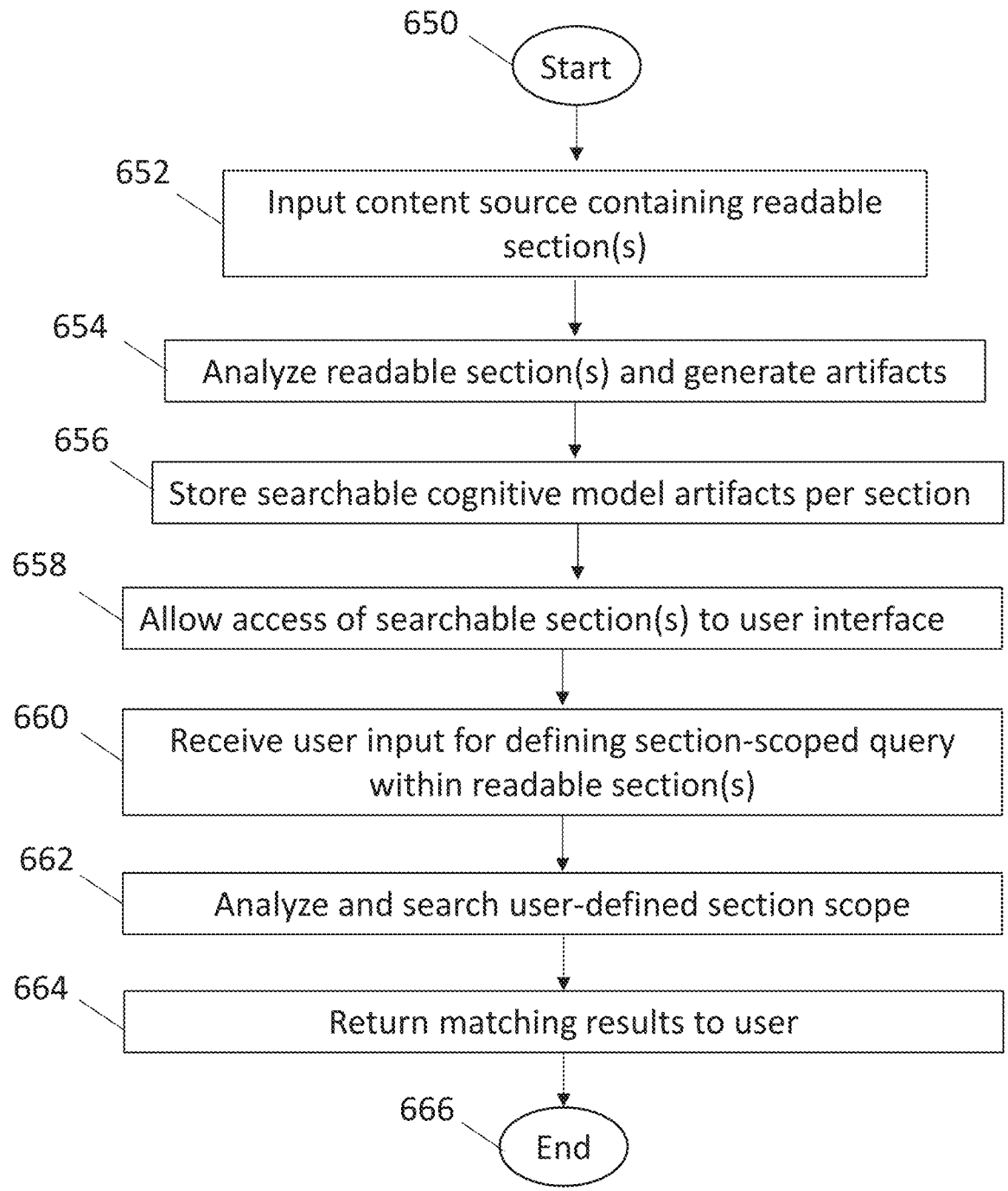
FIG. 7 is a flow diagram illustrating a method of selectively targeting content sections of data included in a content source according to another non-limiting embodiment of the present invention.

With reference to FIG. 7, a method of selectively targeting content sections of data included in a content source is illustrated according to another non-limiting embodiment of the present invention. The method includes operations similar to those described above with respect to FIG. 7. In this non-limiting embodiment, however, the user's designation of which sections are relevant to their user group is performed at a different stage of the flow process.

For example, the method begins at operation 650 and at operation 652 one or more content sources including one or more detectable objects are input to the object domain unit 101. At operation 654, the NLP unit 110 analyzes the readable sections and generates one or more artifacts corresponding to a respective readable section. The artifacts include, but are not limited to, concepts, attributes, entities, relations, etc.). At operation 654, the NLP unit 110 can also generate metadata that indexes one or more given artifacts to a respective section. The artifacts and metadata (e.g., section headings) are then stored in an artifact storage unit 112 at operation 656. In this manner, the artifacts stored in the artifact storage unit 112 can be searched on a per-section basis.

Turning to operation 658, the user interface 120 is allowed access to the artifact storage unit 112. In one or more non-limiting embodiments, the searchable sections corresponding to the artifacts stored in the artifact storage unit 112 are displayed on a display unit 122 included with the user interface 120. At operation 660, the user submits, via the user interface 120, a section-scoped query which is received by the search engine 130. As described herein, the section-scoped query unit 126 prompts the user to define the section-scoped query to be performed on one or more of the sections corresponding to the artifacts stored in the artifact storage unit 112. For example, the user can operate the user-interface 120 to input one or more query terms and to select one or more displayed sections to be searched within the artifact storage unit 112. Sections that are not selected by the user are thus not searched within the storage unit 112. Turning to operation 662, the search engine 130 searches the artifact storage unit 112 and analyzes the artifacts corresponding to a respective section indicated by the user's section-scoped query. At operation 664, the search engine 130 returns results including, for example, artifacts and content (e.g. textual data), from the sections that match the user's section-scoped query input, and the method ends at operation 666.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
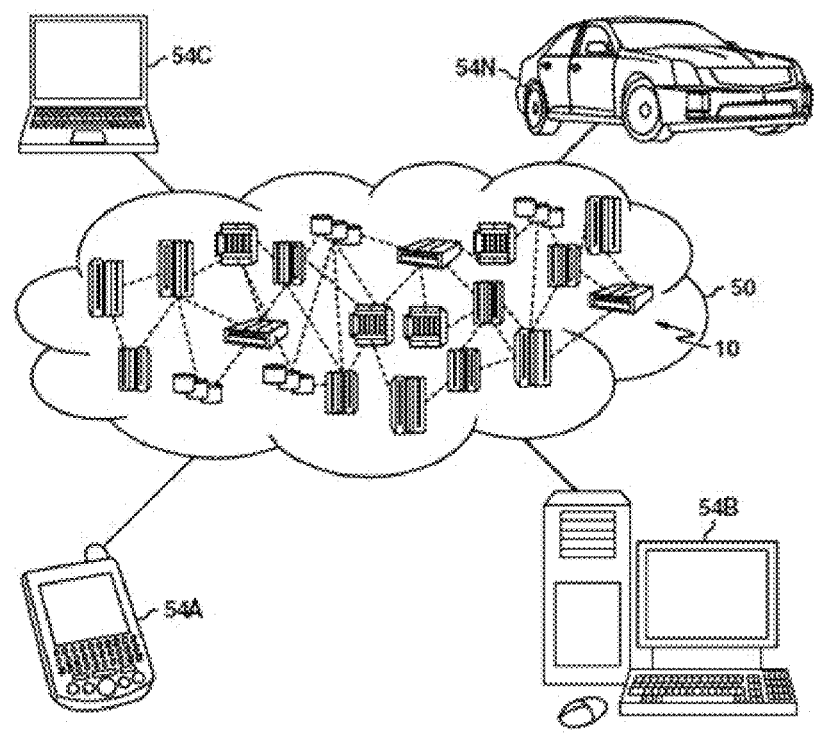
FIG. 8 illustrates a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
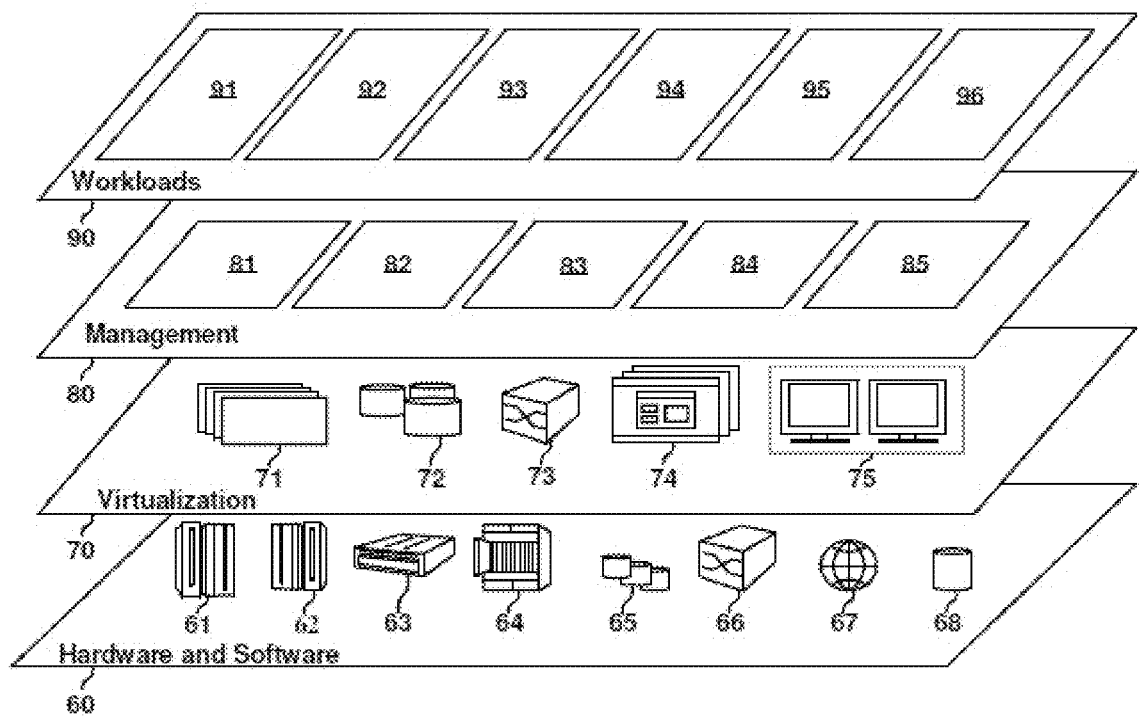
FIG. 9 illustrates abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced section detecting 96.

Figure 10:
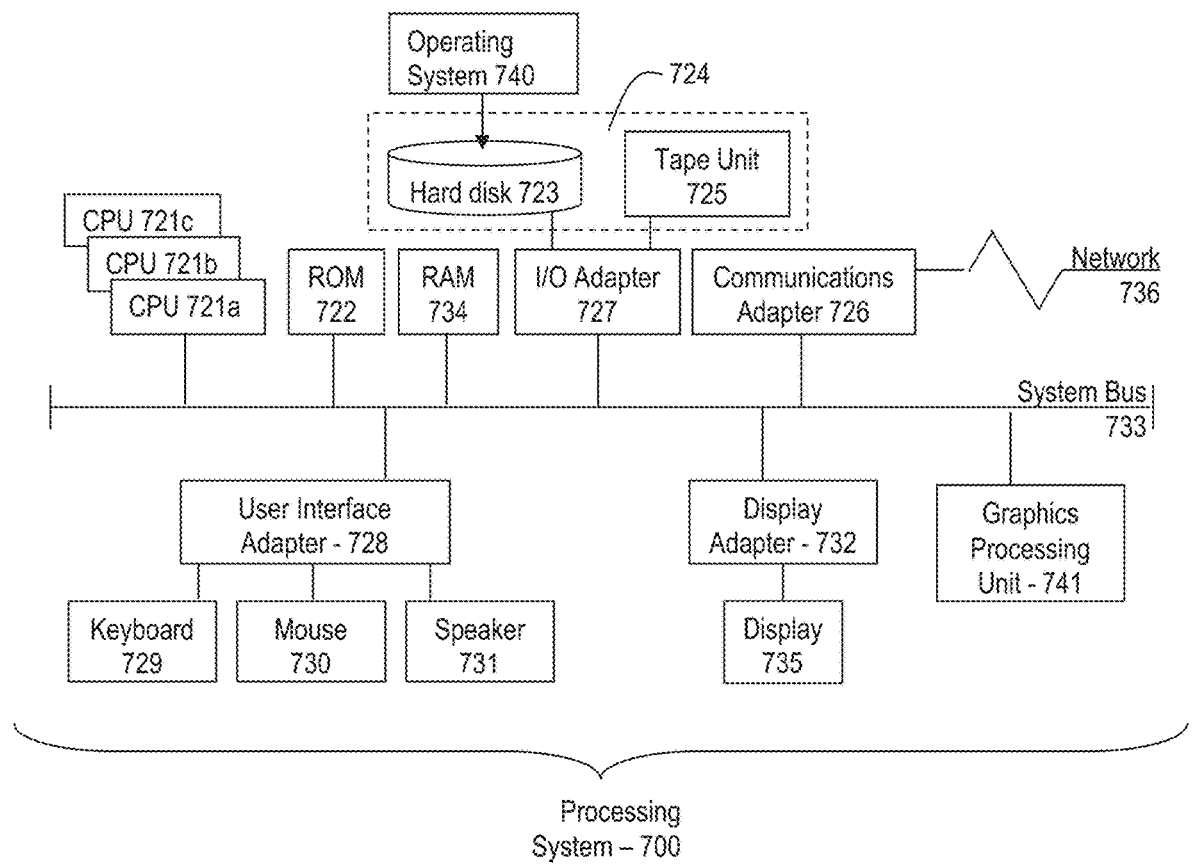
FIG. 10 illustrates a block diagram of a computer system for use in implementing one or more embodiments of the present invention.

It is understood that the present disclosure is capable of being implemented in conjunction with any other type of computing environment now known or later developed. For example, FIG. 10 depicts a block diagram of a processing system 700 for implementing the techniques described herein. In examples, the processing system 700 has one or more central processing units (processors) 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of the processing system 700.

Further depicted are an input/output (I/O) adapter 727 and a network adapter 726 coupled to the system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to the system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to the system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. An input device 729 (e.g., a keyboard, a microphone, a touchscreen, etc.), an input pointer 730 (e.g., a mouse, trackpad, touchscreen, etc.), and/or a speaker 731 may be interconnected to system bus 733 via user interface adapter 728, which may include, for example, a Super I/O chip integrating multiple device adapters into a single integrated circuit.

In some aspects of the present disclosure, the processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing and has a highly parallel structure that makes it more effective than general-purpose CPUs for algorithms where processing of large blocks of data is done in parallel.

Thus, as configured herein, the processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in the processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, unit, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
inputting a plurality of content sources to an object domain unit that includes a machine learning unit comprising a convolutional neural network-based classifier;
training the machine learning unit to learn different types of objects included in the plurality of content sources, the objects including at least one of paragraphs of text, figures, bullet points, and titles;
generating, by a formatting unit, object metadata that identifies the different types of objects, respectively, mapping, by the formatting unit, the object metadata to each of the objects included in a content source among the plurality of content sources input to the object domain unit, and embedding by the formatting unit, the object metadata into machine-encodable text of the mapped object;
analyzing, via a natural language processing (NLP) unit, the machine-encodable text of at least one of the content sources among the plurality of content sources to identify a plurality of sections containing searchable content based on the object metadata;
generating, via the NLP unit, section metadata respective to each identified section included in the at least one content source;
storing the section metadata in a storage unit;
receiving, via a user interface, a section-scoped query including at least one designated content source section indicating at least one of the sections included in the plurality of content sources; and based on the section-scoped query, delivering first machine-encodable text of one or more sections that matches the at least one designated content source section without delivering remaining sections that do not match the at least one designated content source section; extracting by the NLP unit at least one first section metadata from the machine-encodable text of the one or more sections matching the at least one designated content source section, and analyzing via a search engine, the at least one first section metadata without analyzing the at least one second section metadata corresponding to the remaining sections.

2. The computer-implemented method of claim 1, wherein the at least one content source includes a first content source including a first plurality of sections and a second content source including a second plurality of sections, the second content source being different from the first content source.

3. The computer-implemented method of claim 2, wherein first content of the first content source is different from second content of the second content source.

4. The computer-implemented method of claim 3, wherein the search engine returns the first content corresponding to the at least one first section metadata in response to the first content matching the section-scoped query.

5. The computer-implemented method of claim 4, wherein the first content source is a first document image and the second content source is a second document image.

6. The computer-implemented method of claim 2, wherein the section metadata includes at least one heading corresponding to a respective identified section.

7. The computer-implemented method of claim 6, further comprising displaying the at least one heading on a display unit included with the user interface.

8. A computer system comprising:
an object domain unit configured to receive a plurality of content sources;
a machine learning unit comprising a convolutional neural network-based classifier configured to learn different types of objects included in the plurality of content sources, the objects including at least one of paragraphs of text, figures, bullet points, and titles;
a formatting unit configured to generate object metadata that identifies the different types of objects, respectively, maps the object metadata to each of the objects included in a content source among the plurality of content sources input to the object domain unit, and embeds the object metadata into machine-encodable text of the mapped object;
a natural language processing (NLP) unit configured to analyze at the machine-encodable text of at least one least one the content sources among the plurality of content sources to identify a plurality of sections containing searchable content based on the object metadata, and to generate section metadata respective one or more sections included in the at least one content source;
a storage unit configured to store the section metadata; a user interface configured to receive a section-scoped query including at least one designated content source section indicating at least one of the sections included in the plurality of content sources; and
a search engine that, based on the section-scoped query, is configured to analyze section metadata, wherein based on the section-scoped query, the formatting unit delivers first machine-encodable text of one or more of the sections that matches the at least one designated content source section without delivering remaining sections that do not match the at least one designated content source section, wherein the NLP unit extracts at least one first section metadata from the machine-encodable text of the one or more sections matching the at least one designated content source section, and wherein the search engine analyzes the at least one first section metadata without analyzing at least one second section metadata corresponding to the remaining sections.

9. The computer system of claim 8, wherein the at least one content source includes a first content source including a first plurality of sections and a second content source including a second plurality of sections, the second content source being different from the first content source.

10. The computer system of claim 9, wherein first content of the first content source is different from second content of the second content source.

11. The computer system of claim 10 wherein the search engine returns the first content corresponding to the at least one first section metadata in response to the first content matching the section-scoped query.

12. The computer system of claim 11, wherein the first content source is a first document image and the second content source is a second document image.

13. The computer system of claim 9, wherein the section metadata includes a heading corresponding to a respective identified section.

14. The computer system of claim 13, wherein the user interface displays the headings.

15. A computer program product to control a computer system to selectively target content sections of raw data included in a raw content source, the computer program product comprising a computer readable storage medium having program instructions embodied therewith, the program instructions executable by an electronic computer processor to control the computer system to perform operations comprising:
inputting a plurality of content sources to an object domain unit that includes a machine learning unit comprising a convolutional neural network-based classifier;
training the machine learning unit to learn different types of objects included in the plurality of content sources, the objects including at least one of paragraphs of text, figures, bullet points, and titles;
generating, by a formatting unit, object metadata that identifies the different types of objects, respectively, mapping, by the formatting unit, the object metadata to each of the objects included in a content source among the plurality of content sources input to the object domain unit, and embedding by the formatting unit, the object metadata into machine-encodable text of the mapped object;
analyzing, via a natural language processing (NLP) unit, the machine-encodable text of at least one of the content sources among the plurality of content sources to identify a plurality of sections containing searchable content based on the object metadata;
generating, via the NLP unit, section metadata respective to each identified section included in the at least one content source;
storing the section metadata in a storage units;
receiving, via a user interface, a section-scoped query including at least one designated content source section indicating at least one of the sections included in the plurality of content sources; and based on the section-scoped query, delivering first machine-encodable text of the one or more sections that matches the at least one designated content source section without delivering remaining sections that do not match the at least one designated content source section;

extracting by the NLP unit at least one first section metadata from the machine-encodable text of the one or more sections matching the at least one designated content source section, and analyzing via a search engine, the at least one first section metadata-without analyzing the at least one second section metadata corresponding to the remaining sections.

16. The computer program product of claim 15, wherein the at least one content source includes a first content source including a first plurality of sections and a second content source including a second plurality of sections, the second content source being different from the first content source.

17. The computer program product of claim 16, wherein first content of the first content source is different from second content of the second content source.

18. The computer program product of claim 17, wherein the search engine returns the first content corresponding to the at least one first section metadata in response to first content matching the section-scoped query.

19. The computer program product of claim 18, wherein the first content source is a first document image and the second content source is a second document image.

20. The computer program product of claim 16, wherein the section metadata includes a heading corresponding to a respective identified section, and the operations further comprise displaying that least one heading on a display unit included with the user interface.

* * * * *